Sept. 16, 1930. G. W. EMRICK 1,775,993
CHUCK DEVICE
Filed Sept. 18, 1928
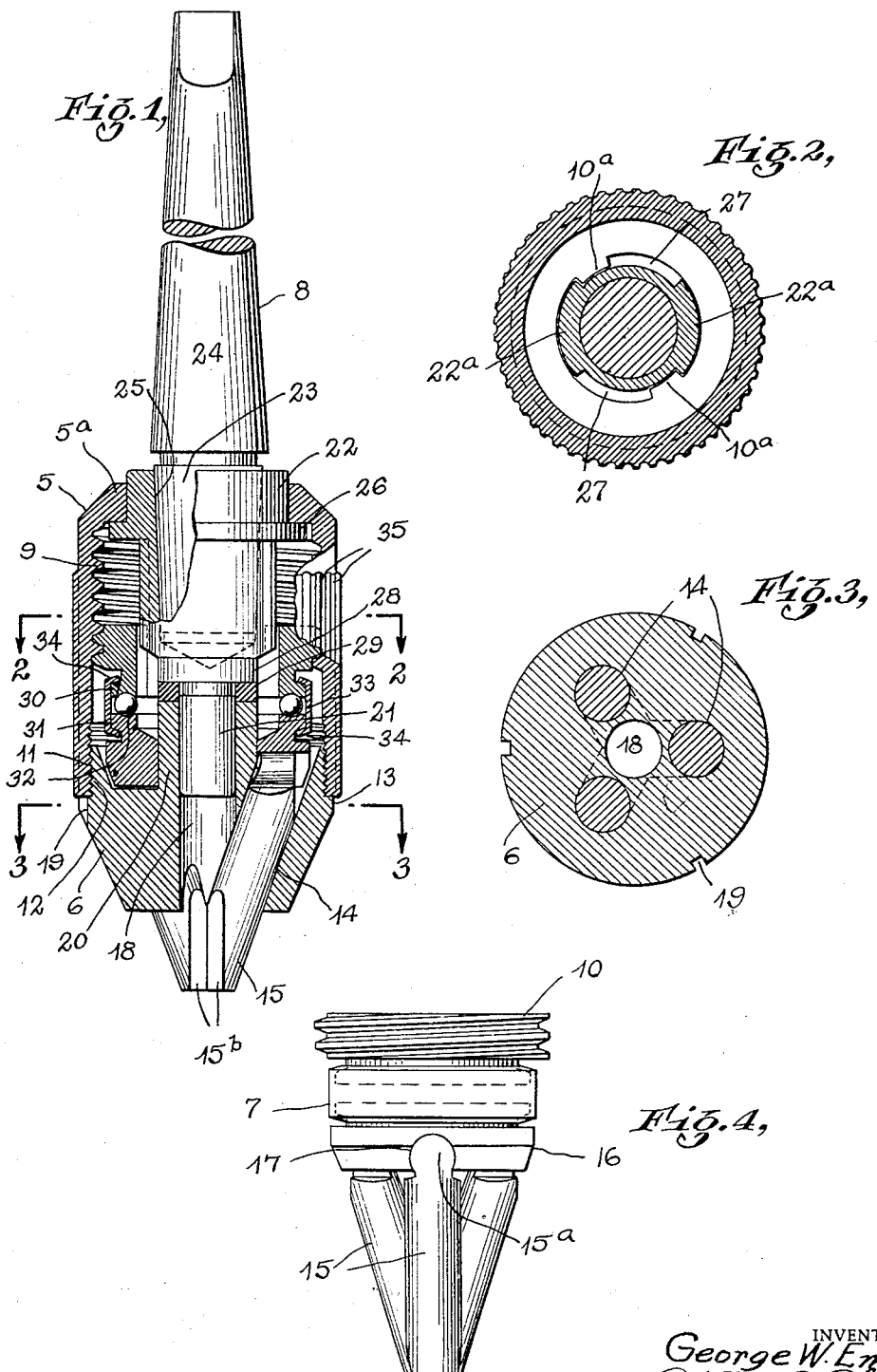
INVENTOR
George W. Emrick.
BY
ATTORNEY Patented Sept. 16, 1930

1,775,993

UNITED STATES PATENT OFFICE

GEORGE W. EMRICK, OF BROOKLYN, NEW YORK, ASSIGNOR, BY MESNE ASSIGNMENTS, TO ETTCO TOOL CO. INC., OF BROOKLYN, NEW YORK, A CORPORATION OF NEW YORK

CHUCK DEVICE

Application filed September 18, 1928. Serial No. 306,752.

This invention relates to chuck devices of various kinds and classes and particularly to what are known as drill chucks; and the object of the invention is to provide a device of this class with improved means for mounting or coupling the chuck body in connection with the spindle to provide relative movement between the spindle and chuck body, facilitating the quick disengagement of a drill or other tool from the jaws of the chuck device by releasing the jaw operating means through what may be termed a hammer blow; a further object being to provide a coupling between the spindle and chuck device involving a rotary clutch for transmitting the movement of the spindle to the tool supporting jaws of the chuck wherein free rotary movement is provided between the respective members of the clutch, permitting one clutch member to strike the other producing a hammer blow in releasing the tool engaging jaws; a still further object being to provide a chuck of the class described involving three independent units which may be manufactured and sold separately, collectively or in any two pairs of units, especially in the replacement of worn or broken parts; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a sectional view of a chuck made according to my invention with part of the construction broken away.

Fig. 2 is a section on the line 2—2 of Fig. 1.

Fig. 3 is a section on the line 3—3 of Fig. 1; and,

Fig. 4 is a detail view of one of the units which I employ, detached from the other units of the device.

My improved chuck device is designed for use in connection with tools, machines or devices of any kind or class and especially in connection with electric drilling machines. In chuck devices as are in common use, it is often experienced that the drill or tool supported therein, in most instances, becomes wedged and securely bound to the chuck by the jaws thereof, by virtue of the stress or strain to which the drill or tool is subjected, causing extreme difficulty and inconvenience in the removal of the drill or tool from the chuck, and this is especially true when the chuck device is used on electric drilling machines, wherein the spindle of the chuck is coupled with and constitutes the armature shaft of the electric motor.

It is one of the principle features of my invention to provide a chuck device wherein the quick and easy release of firmly engaged tools may be facilitated in a simple and practical manner, and this result is accomplished by providing means for imparting a hammer blow to the jaw operating member or unit of the chuck to free said jaws from the tool.

In carrying my invention into effect as shown in the accompanying drawing, I employ two casing parts 5 and 6, which constitute one unit part of the device, termed a casing unit. At 7, I have shown in Fig. 4 of the drawing, the jaw supporting and operating unit of the device, and at 8, Fig. 1 of the drawing, I have shown the spindle unit of the device.

The casing 5 is tubular in form and provided at one end thereof with an internal screw thread 9 in connection with which a screw threaded collar 10 on the unit 7 operates to feed said unit upwardly and downwardly in the casing 5, and the other or lower end of the casing 5 is internally threaded as seen at 11 to permit of the attachment of the casing part 6 therewith, the latter being externally threaded as seen at 12 to engage the threads 11. The part 6 has a shoulder 13 which abuts the lower wall of the casing part 5. The part 6 where it projects from the part 5 is substantially conical in form and is provided with angularly arranged bores 14, three of which are shown. These bores are equally spaced circumferentially of the part 6 and are adapted to receive and guide three jaw members 15 in their movement inwardly and outwardly as well as radially in the chuck device.

The jaws 15 constitute part of the unit 7 and are supported upon a mounting ring 16 having three substantially circular sockets 17 in which cylindrical heads 15$^a$ of the jaws 15 are slidably mounted, permitting radial movement of the jaws with respect to the mounting ring 16. The inner and adjacent faces of the jaws 15 at the lower ends thereof are provided with angularly and perpendicularly arranged jaw faces 15$^b$ adapted to engage a drill or other tool mounted in the central bore 18 of the part 6.

It will be noted that the periphery of the part 6 adjacent the shoulder 13 is provided with a plurality of notches 19 to receive a spanner or other wrench, facilitating the coupling and uncoupling of the parts 5 and 6. It will also be noted that the part 6 is provided with an upwardly directed tubular extension 20 which forms an axis for the jaw mounting ring 16 and also a bearing for a projecting trunnion 21 constituting part of the spindle unit 8 or an adaptor 22 mounted on the tapered end 23 of the spindle proper 24.

The adapter 22 has a tapered bore 25 to receive the tapered end 23 of the spindle firmly coupling the adapter therewith, the taper being very slight, but this coupling may be made by a drive pivot or in any other manner, insuring the firm coupling of the parts. It will be noted on a consideration of Fig. 1 of the drawing that the adapter 22 is rotatably mounted in a bearing portion 5$^a$ at the upper end of the part 5, and has within said part a projecting annular flange 26 retaining the spindle unit 8 against displacement from the casing. On the periphery of the shank portion of the adapter 22 are oppositely arranged and radially projecting clutch members 22$^a$ adapted to cooperate with inwardly projecting clutch members 10$^a$ on the part 10 of the unit 7. The circumferential dimensions of the members 22$^a$ and 10$^a$ are such as to leave a comparatively long circumferential clearance space designated at 27, note Fig. 2 of the drawing between said members permitting the free rotary movement of the casing unit and the spindle unit with reference to each other when the unit 7 is in firm engagement with the casing unit for supporting a tool in the chuck device, thus permitting the release and movement of the unit 7 relatively to the casing unit by a hammer blow resulting from a quick rotary reciprocation of the casing unit upon the spindle unit carrying the unit 7 with the casing unit in this operation.

At the upper end of the trunnion 21, the adapter 22 is provided with a shoulder 28 between which and the upper end of the tubular extension 20 is arranged a washer 29. At this time, it is well to note that a tool to be supported by the chuck, when placed in the bore 18, bears directly upon the trunnion 21 and thus upon the spindle unit 8 as a whole.

The collar 10 of the unit 7 is provided at its lower end with an annular projecting flange 30, and the ring 16 at its upper end with a corresponding projecting flange 31. The adjacent faces of the flange portions of said parts are fashioned to form annular grooves for receiving a plurality of bearing balls 32 which are disposed between the faces of said parts as clearly seen in Fig. 1 of the drawing, permitting free and independent rotation of the separate parts 10 and 16 as well as to take up the thrust between said parts in the operation of the chuck.

In coupling the parts 10 and 16 together to form the unit 7 thereof, I employ a coupling ring 33, the side edges of which are spun or otherwise turned inwardly and radially as seen at 34, forming retaining flanges cooperating with the flanges 30 and 31. These parts are coupled together when the balls 32 have been placed in proper position between the adjacent faces of said parts. It will be seen from the foregoing that the manner of coupling the parts 10 and 16 together forms of the unit 7, a ball bearing wherein the separate elements or parts constitute the ball races of the bearing.

To facilitate the rotation of the casing 5, I provide the outer wall thereof with longitudinally arranged and circumferentially spaced ribs 35 which extend throughout the major length of the part 5 of the casing. In addition to facilitating this rotary operation, said ribs also reinforce and strengthen the wall structure of the casing.

The operation of the device will be readily understood from the foregoing description when taken in connection with the accompanying drawing and the following statement. In placing a tool in the chuck, the casing is rotated to feed the collar 10 or in other words the entire unit 7 upwardly in said casing, in which operation, the jaws 15 are moved upwardly in the bores 14 and radially with respect to the axis of the chuck. When the jaw faces 15$^b$ are separated sufficiently to engage the shank of a drill or other tool, the rotation of the casing is reversed to move the unit 7 downwardly and feed the jaws 15 inwardly into firm engagement with the shank of the tool. It will thus be apparent that in the rotation of the spindle unit 8 for driving the drill in the operation of drilling a workpiece, the stress upon the unit 7 is to rotate the collar 10 in a direction to feed the jaws 15 downwardly and inwardly, tending to more firmly engage the tool. Clutch members 22ª and 10ª are in engagement in this operation.

When it is desired to release the tool after being firmly gripped by the jaws 15, the casing 5 is given a sudden rotary movement by a quick thrust or striking of the ribs 35 on the periphery thereof. In this movement, the members 10ª carried by the collar 10 move freely through the clearance spaces 27 and suddenly engage the members 20ª, causing the release and upward feeding of the collar 10, thus disengaging the jaws 15 from the tool.

In this connection, it will be noted upon a consideration of Fig. 1 of the drawing that the members 10ª and 22ª are arranged longitudinally of the respective parts 10 and 22, thus permitting the movement of the collar 10 longitudinally of the spindle adapter 22, but regardless of the position of the collar 10, when the device is assembled the members 10ª and 22ª are in engagement.

It will be understood that my improved chuck device may be manufactured and sold as a complete unit, or this unit may consist of all of the parts except the spindle 24 proper. On the other hand, the device may consist of all of the parts except the unit 8 which includes the spindle 24 and adapter 22. To facilitate the manufacture and sale of the several parts or units and especially in the replacement of parts of old devices, the unit 7 may be manufactured and sold separately and the casing unit similarly manufactured and sold. However, in the last instance, the separate parts 5 and 6 may if desired be sold separately. It will also be understood that the spindle unit 8 may be manufactured and sold independently of the remainder of the device.

It will be apparent that while I have shown and described one use of my invention and one assemblage of parts of more or less specific construction, that I am not necessarily limited to the structural details of the parts herein shown and described, and various other changes in and modifications of the construction herein set forth may be made within the scope of the appended claims without departing from the spirit of my invention or sacrificing its advantages.

Having fully described my invention, what I claim as new and desire to secure by Letters Patent, is:—

1. A chuck of the class described comprising a casing, a jaw supporting and operating unit mounted in said casing and including jaws supported in the casing to move longitudinally and radially with respect to the axis thereof, said unit including an independently rotatable part in threaded engagement with said casing and provided with a clutch face, and a spindle actuated member mounted in the casing and having a clutch face cooperating with the clutch face of said parts, and said clutch faces permitting the free and independent movement of said part longitudinally and circumferentially with reference to said member.

2. A chuck of the class described comprising a casing, a jaw supporting and operating unit mounted in said casing and including jaws supported in the casing to move longitudinally and radially with respect to the axis thereof, said unit including an independently rotatable part in threaded engagement with said casing and provided with a clutch face and a spindle actuated member mounted in the casing and having a clutch face cooperating with the clutch face of said part, said clutch faces permitting the free and independent movement of said part longitudinally and circumferentially with reference to said member, and said casing including a tubular portion forming an axis for said unit and a bearing for the inner end of said member.

3. A chuck of the class described comprising a casing consisting of a tubular part having an internal screw thread at one end thereof, and a substantially conical jaw guiding part secured to said tubular part, a jaw supporting and operating unit arranged in said casing parts and including a screw threaded collar adapted to engage the screw threads of said casing to feed said unit and the jaws thereof longitudinally of the casing.

4. A chuck of the class described comprising a casing consisting of a tubular part having an internal screw thread at one end thereof and a substantially conical jaw guiding part secured to said tubular part, a jaw supporting and operating unit arranged in said casing parts and including a screw threaded collar adapted to engage the screw threads of said casing to feed said unit and the jaws thereof longitudinally of the casing, and said unit including a jaw supporting ring independently rotatable with respect to said collar.

5. A chuck of the class described comprising a casing consisting of a tubular part having an internal screw thread at one end thereof and a substantially conical jaw guiding part secured to said tubular part, a jaw supporting and operating unit arranged in said casing parts and including a screw threaded collar adapted to engage the screw threads of said casing to feed said unit and the jaws thereof longitudinally of the casing, said unit including a jaw supporting ring independently rotatable with respect to said collar, and bearing balls disposed between adjacent ends of said ring and collar and said bearing balls being movable radially with respect thereto.

6. A chuck of the class described comprising a casing consisting of a tubular part having an internal screw thread at one end thereof, and a substantially conical jaw guiding part secured to said tubular part, a jaw supporting and operating unit arranged in said casing parts and including a screw threaded collar adapted to engage the screw threads of said casing to feed said unit and the jaws thereof longitudinally of the casing, a spindle member rotatably supported in said casing, and cooperating elements on said member and collar for keying the same together and permitting rotary and sliding movement of the collar with respect to said member.

7. A chuck of the class described comprising a casing consisting of a tubular part having an internal screw thread at one end thereof, and a substantially conical jaw guiding part secured to said tubular part, a jaw supporting and operating unit arranged in said casing parts and including a screw threaded collar adapted to engage the screw threads of said casing to feed said unit and the jaws thereof longitudinally of the casing, a spindle member rotatably supported in said casing and cooperating elements on said member and collar for keying the same together and permitting rotary and sliding movement of the collar with respect to said member, the jaw guiding part of the casing having a central bore for receiving the shank of a tool, and said member having a trunnion extending into said bore and against which the end of the tool is adapted to bear.

8. In a chuck device of the class described involving a chuck casing and jaws movably supported in said casing for engagement with a tool adapted to be secured thereto, a spindle rotatably mounted in said casing, a jaw actuating part in screw threaded engagement with the casing, said part being movable longitudinally with respect to said spindle, interengaging clutch surfaces on said part and spindle, said part including a casing having free rotary movement with respect to the spindle to permit the release of said jaws through a hammer blow imparted to said interengaging clutch surfaces.

9. In a chuck of the class described involving a chuck casing, a jaw actuating part in said casing and having jaws movable relatively thereto, a spindle in said casing, means for clutching the spindle with said jaw operating part involving cooperating clutch elements on said part and spindle, said clutch elements having free rotary movement with respect to each other without imparting movement to said jaws whereby the clutch element of one part will, in sudden rotary movement imparted to said casing, strike that of the other part in the operation of moving said jaws in one direction.

10. A chuck of the class described comprising a casing, one end of which is provided with a plurality of circumferentially spaced and converging jaw receiving bores, a central tool receiving bore, a spindle member rotatably supported in the other end of the casing and including a part extending into the tool receiving bore of the casing, a jaw supporting and operating unit arranged in the casing and including jaw members movable radially with respect thereto, said jaws being arranged in the bores of the casing, said unit involving a feed collar in screw threaded engagement with the casing and having a clutch engagement with said spindle member whereby the rotation of said casing will feed said unit longitudinally of the casing to move said jaws radially with respect to a tool to be supported thereby.

11. A chuck of the class described comprising a casing, one end of which is provided with a plurality of circumferentially spaced and converging jaw receiving bores, a central tool receiving bore, a spindle member rotatably supported in the other end of the casing and including a part extending into the tool receiving bore of the casing, a jaw supporting and operating unit arranged in the casing and including jaw members movable radially with respect thereto, said jaws being arranged in the bores of the casing, said unit involving a feed collar in screw threaded engagement with the casing and having a clutch engagement with said spindle member whereby the rotation of said casing will feed said unit longitudinally of the casing to move said jaws radially with respect to a tool to be supported thereby, said spindle member having clutch elements arranged longitudinally thereof, and said collar being movable longitudinally of said member and having clutch elements adapted to cooperate with the clutch elements of said member in the several positions thereof.

12. A chuck of the class described comprising a casing, one end of which is provided with a plurality of circumferentially spaced and converging jaw receiving bores, a central tool receiving bore, a spindle member rotatably supported in the other end of the casing and including a part extending into the tool receiving bore of the casing, a jaw supporting and operating unit arranged in the casing and including jaw members movable radially with respect thereto, said jaws being arranged in the bores of the casing, said unit involving a feed collar in screw threaded engagement with the casing and having a clutch engagement with said spindle member whereby the rotation of said casing will feed said unit longitudinally of the casing to move said jaws radially with respect to a tool to be supported thereby, said spindle member having clutch elements arranged longitudinally thereof, said collar being movable longitudinally of said member and having clutch elements adapted to cooperate with the clutch elements of said member in the several positions thereof, and the clutch elements of said collar being circumferentially spaced with reference to the clutch elements of said member whereby said collar will have free and limited rotary movement with respect to said member in the several positions thereof.

In testimony that I claim the foregoing as my invention I have signed my name this 14th day of Sept., 1928.

GEORGE W. EMRICK.